April 3, 1962    J. E. COLLINS    3,028,165
ANNULAR PACKING MEMBER
Original Filed May 25, 1954

INVENTOR.
John E. Collins
BY
Hyde, Meyer, Baldwin & Doran
ATTORNEYS

United States Patent Office 3,028,165
Patented Apr. 3, 1962

3,028,165
ANNULAR PACKING MEMBER
John E. Collins, Akron, Ohio, assignor to International Basic Economy Corporation, New York, N.Y., a corporation of New York
Continuation of application Ser. No. 432,104, May 25, 1954. This application June 22, 1959, Ser. No. 823,273
3 Claims. (Cl. 277—206)

This invention relates to improvements in an annular packing member. This application is a continuation of my application Serial No. 432,104, filed May 25, 1954, and now abandoned.

One of the objects of the present invention is to provide a packing member or packing means shaped to effect a mechanical lock to make it impossible to pull the packing loose from its lodging while still permitting flexing action desirable in a packing member.

A further object of the present invention is to provide a packing member being characterized by its structural simplicity, inexpensive manufacturing cost, operating efficiency and ease of assembly into operative position.

Other features of this invention reside in the arrangement and design of the parts for carrying out their appropriate functions.

Other objects and advantages of this invention will be apparent from the accompanying drawings and description and the essential features will be set forth in the appended claims.

In the drawings:

FIG. 2 is an enlarged transverse or cross sectional view of the packing means in FIG. 1; while

Figure 3:
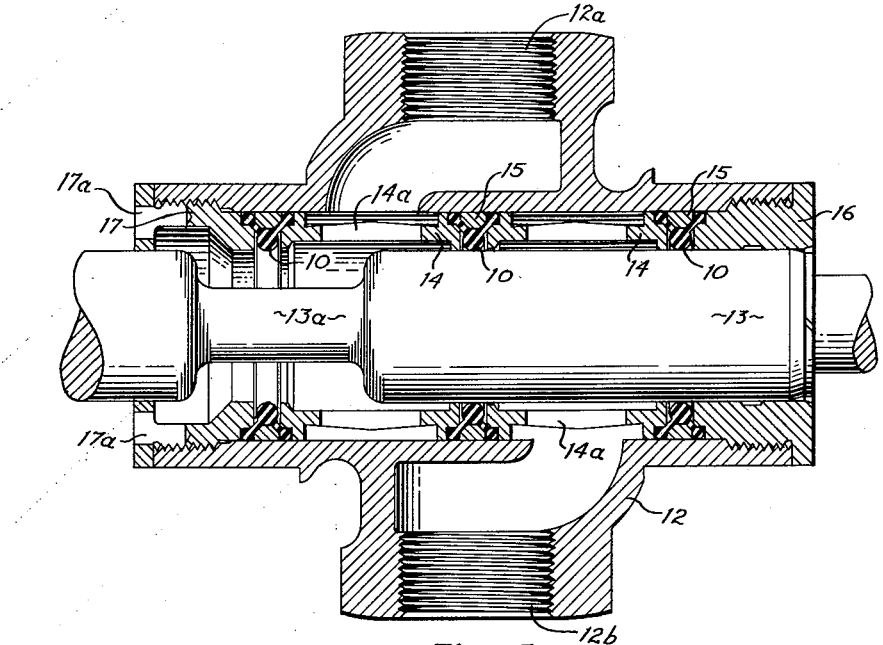
FIG. 3 is a longitudinal sectional view through a valve using the packing means of FIG. 1.

Before the packing means here illustrated is specifically described, it is to be understood that the invention here involved is not limited to the structural details or arrangements of parts here shown, since packing means embodying the present invention may take various forms. Also, the packing means may be used in a valve, such as shown in FIG. 3, or be suitably mounted in any other type of structure in which sealing is desired. It also is to be understood that the phraseology or terminology herein employed is for purposes of description and not of limitation since the scope of the present invention is denoted by the appended claims.

While my invention in a packing means might be used for various purposes and mounted in various manners in different structures, I have chosen to show the same as applied to the plunger type, three way valve in FIG. 3. However, it should be clearly understood that the packing means in FIGS. 1 and 2 may be mounted in a different structural manner and be used with other assemblies wherein sealing is important.

Figure 1:
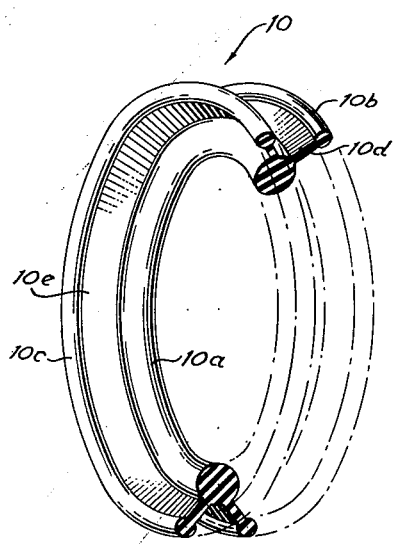
FIG. 1 is an enlarged perspective view of the packing means or packing member of the present invention with a portion thereof cut away to show the cross section thereof.
Figure 2:
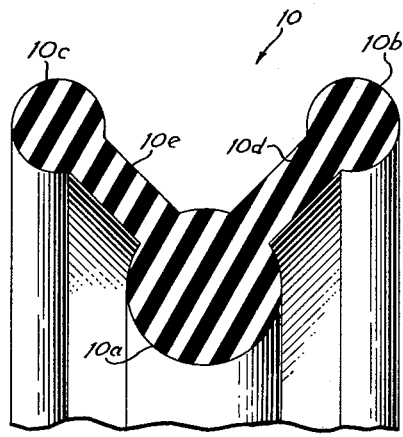

The packing means 10 in FIGS. 1 and 2 is the subject of the present invention. It is annular and is manufactured as an integral, one-piece member by molding to the desired form rubber, rubber-like material, or other suitable resilient sealing material. This packing means 10 includes three annular members 10a, 10b and 10c with each of these members generally circular in traverse section so as to be of O-ring shape. The annular member 10a has a larger diameter to its transverse section than the annular members 10b and 10c with the last mentioned members having approximately equal area transverse sections. Annular webs 10d, 10e are integrally joined to and connect respectively annular members 10a, 10b and 10a, 10c with each of these webs being of a thickness in transverse section less than any one of the annular members to which is connects. These webs 10d and 10e are solid annular webs so that no leagage can occur axially of the packing means 10 between the annular members 10a, 10c and 10a, 10b. These webs and annular members form a generally V-shaped or Y-shaped cross section in FIG. 2 to the packing means 10.

In FIG. 2, the V-shaped cross section opens outwardly since the annular diameter is smaller for the member 10a than for the members 10b and 10c. However, it will be apparent as this description proceeds that the V-shape can open inwardly toward the bore of the packing means and certain of the advantages for the packing means 10 will also be present. In this latter construction, the annular member 10a would form the maximum diameter of the packing means while annular members 10b and 10c would form the minimum diameter or bore thereof.

This packing means 10 has many uses and only one has been shown for illustrative purposes in FIG. 3. Here, a valve body 12 has reciprocably mounted in a bore thereof a valve stem or plunger 13 for opening or closing the flow passageway between ports 12a and 12b in the valve body. The valve stem and valve body serve as relatively movable inner and outer members with a plurality of packing means 10 and annular elements 14, 15 sealing the space between the members 12 and 13 to prevent endwise leakage between these members. Annular spacer sleeve elements 14 abut against the opposite sides of each packing means 10 while an annular wedge 15 bears against the inner sides of the arms forming the V-shape. Screw type end plugs 16 and 17 are detachably mounted by screw threads in opposite ends of the valve body bore so as to hold the annular elements 14 and 15 as well as the packing means 10 in the assembled relationship shown in FIG. 3 and fixed against movement with respect to the valve body member 12. These easily removable end plugs also permit quick and convenient assembly and disassembly of the parts and also provide a surface to bear against the axially outermost packing means 10 on the left and on the right in FIG. 3.

The packing means 10 seals not only the bore of the valve body member 12 but also the periphery of the valve stem member 13. The annular, O-ring shaped member 10a contacts the movable valve stem member 13 to provide a dynamic contact while annular members 10b and 10c provide a static contact with the bore of valve body 12.

When the valve stem 13 is in the FIG. 3 position, flow between the ports 12a and 12b is cut off but port 12a may exhaust through exhaust ports 17a in end plug 17. However, when the valve stem member 13 is moved toward the right so that a necked down portion 13a thereon straddles the center packing means 10, flow may take place from the valve body port 12a to the valve body port 12b through ports 14a of the annular spacer sleeve elements 14 and along the necked down portion 13a of the valve stem. Exhaust flow out ports 17a has been cut off. Grooves are provided in the periphery and in the bore of each spacer element 14 so that flow may take place through one or more of the plurality of circumferentially spaced ports 14a in the annular wall of each spacer sleeve element 14.

The packing means 10 has several advantages and these are especially apparent when it is mounted in a valve in the manner shown in FIG. 3. First, the packing means 10 has greater stability with respect to blow-out and dislodging from its mounting because a mechanical lock coacts with the V-shape or Y-shape to hold the packing means 10 in proper location. Blow-out occurs, for example, when the valve stem member 13 is suddenly shifted to the right to permit flow between the valve body ports 12a and 12b. This action will produce a sudden pressure change on the sleeve element and packing means and also remove the support from around the bore of the packing means. When the pressure change is sufficiently great and sufficiently sudden, it will tend to squeeze out or blow out the packing means from its mounting, and this is especially true when a conventional O-ring is used. However, in the present construction, the annular elements 14 and 15 coact with the shape of the packing means 10 to mechanically lock it in position so that it is impossible to pull the packing means loose.

Second, the packing means 10 preserves all the advantages of an O-ring since each of the annular members 10a, 10b and 10c are shaped like an O-ring where they make sealing contact with valve members 12 and 13. The connecting web construction also permits the flexing action which is obtained from the ordinary O-ring.

Third, this mechanical lock can be effected with ease and simplicity.

Fourth, a softer (durometer rating) packing means 10 may be used since its hardness is not a factor in maintaining its position against blow-outs. The softer ring will have a longer wear life and provide better sealing.

Again, it should be mentioned that this packing means 10 is shown in FIG. 3 as only one example of its intended use. Either packing means 10 in FIGS. 1 and 2 or any modification thereof within the scope of the appended claims may be used as a packing member for and carried by a movable piston, may be used in a V-shaped groove in one of the members so as to be mounted in a manner similar to an ordinary O-ring, and may be used in many other installations and for many other purposes too numerous to mention with movement taking the form of rotation, reciprocation, etc.

Various changes in details and arrangement of parts can be made by one skilled in the art without departing from either the spirit of this invention or the scope of the appended claims.

I claim:

1. An annular one-piece sealing member formed entirely of flexible resilient material and consisting of a first annular sealing portion of circular cross section, two secondary annular sealing portions of equal circumference and cross-section disposed concentrically of said first portion, the latter secondary sealing portions flanking opposite sides of said first portion in axial and radial offset relation thereto, and circumferentially continuous conical web portions separately interconnecting each said secondary sealing portion with said first portion, each web portion being thinner than said first and said secondary portions it respectively connects and being disposed so that said first and said secondary sealing portions protrude beyond both sides of the web both laterally and radially outward therefrom.

2. An annular sealing member according to claim 1 wherein said secondary sealing portions are of larger circumference than said first portion so that the larger circumferential regions of said conical webs are remote from the first portion.

3. An annular sealing member according to claim 1 wherein said secondary sealing portions are of circular cross section and are of smaller cross sectional area than said first portion.

References Cited in the file of this patent

UNITED STATES PATENTS

| 1,814,678 | Ferguson | July 14, 1931 |
| 2,270,651 | Doyle | Jan. 20, 1942 |
| 2,396,491 | Chamberlain | Mar. 12, 1946 |
| 2,676,040 | Dalton | Apr. 20, 1954 |
| 2,770,510 | Collins | Nov. 13, 1956 |
| 2,892,644 | Collins | June 30, 1959 |